(12) United States Patent
Kallonen

(10) Patent No.: US 7,816,613 B2
(45) Date of Patent: Oct. 19, 2010

(54) ARRANGEMENT FOR WEIGHING TRANSPORT VEHICLE LOAD

(75) Inventor: Miika Kallonen, Nousiainen (FI)

(73) Assignee: Sandvik Mining and Construction Oy, Tampere (FI)

( * ) Notice: Subject to any disclaimer, the term of this patent is extended or adjusted under 35 U.S.C. 154(b) by 453 days.

(21) Appl. No.: 11/794,614

(22) PCT Filed: Jan. 4, 2006

(86) PCT No.: PCT/FI2006/050007
§ 371 (c)(1),
(2), (4) Date: Sep. 12, 2007

(87) PCT Pub. No.: WO2006/072667
PCT Pub. Date: Jul. 13, 2006

(65) Prior Publication Data
US 2009/0266620 A1    Oct. 29, 2009

(30) Foreign Application Priority Data
Jan. 5, 2005 (FI) .................................. 20055008

(51) Int. Cl.
*G01G 19/08* (2006.01)
*G01G 19/12* (2006.01)
(52) U.S. Cl. ........................................ 177/136; 702/174
(58) Field of Classification Search ......... 177/136–139, 177/141; 702/174
See application file for complete search history.

(56) References Cited

U.S. PATENT DOCUMENTS

| | | | | |
|---|---|---|---|---|
| 3,306,383 A | * | 2/1967 | Saxton et al. ............... | 177/136 |
| 3,471,166 A | * | 10/1969 | Clark .......................... | 280/676 |
| 3,504,928 A | * | 4/1970 | Reimer ....................... | 280/104 |
| 3,652,040 A | * | 3/1972 | Hartel ........................ | 244/104 R |
| 3,669,756 A | * | 6/1972 | Bradley ...................... | 177/136 |
| 3,878,908 A | * | 4/1975 | Andersson et al. .......... | 177/136 |
| 3,889,767 A | * | 6/1975 | Scott et al. .................. | 177/136 |
| 3,917,306 A | * | 11/1975 | Madler et al. ............... | 280/104 |
| 4,042,049 A | | 8/1977 | Reichow et al. | |
| 4,312,042 A | * | 1/1982 | Bateman ..................... | 701/124 |
| 4,324,417 A | * | 4/1982 | Johansson ................... | 280/678 |
| 4,507,742 A | * | 3/1985 | Bateman ..................... | 702/101 |
| 4,626,041 A | | 12/1986 | Harbour et al. | |

(Continued)

FOREIGN PATENT DOCUMENTS

CH      683980 A5    6/1994

OTHER PUBLICATIONS

Search Report dated Apr. 6, 2006 issued in PCT Application No. PCT/FI2006/050007.

(Continued)

*Primary Examiner*—Randy W Gibson
(74) *Attorney, Agent, or Firm*—Drinker Biddle & Reath LLP

(57) ABSTRACT

A method for weighing a payload of a transport vehicle, a transport vehicle and a bogie structure. Vertical loads exerted on wheel suspension of the transport vehicle are measured with sensors and the measurement data is conveyed to a calculating unit of weighing. Further, on a side surface of a horizontal arm belonging to the bogie structure there is arranged a sensor for measuring the vertical load exerted on the horizontal arm.

12 Claims, 3 Drawing Sheets

U.S. PATENT DOCUMENTS

| | | | |
|---|---|---|---|
| 4,691,792 A | | 9/1987 | Shintani |
| 4,832,141 A | * | 5/1989 | Perini et al. ............... 177/141 |
| 4,852,674 A | * | 8/1989 | Gudat ....................... 177/141 |
| 4,872,700 A | * | 10/1989 | Mellgren ................... 280/677 |
| 5,161,628 A | | 11/1992 | Wirth |
| 5,205,514 A | * | 4/1993 | Patzig et al. ............ 244/103 R |
| 5,230,392 A | | 7/1993 | Tremblay |
| 5,258,582 A | * | 11/1993 | Junginger .................. 177/141 |
| 5,521,827 A | * | 5/1996 | Lindberg et al. ............ 701/124 |
| 5,811,738 A | | 9/1998 | Boyovich et al. |
| 5,998,741 A | | 12/1999 | Beshears et al. |
| 6,086,088 A | * | 7/2000 | Jurmu ....................... 280/682 |
| 7,096,114 B2 | * | 8/2006 | Feray ........................ 701/117 |

OTHER PUBLICATIONS

Office Action dated Oct. 27, 2005 issued in Finnish Application No. 20055008.

Search Report dated Jun. 26, 2007 issued in Finnish Application No. 20055008.

* cited by examiner

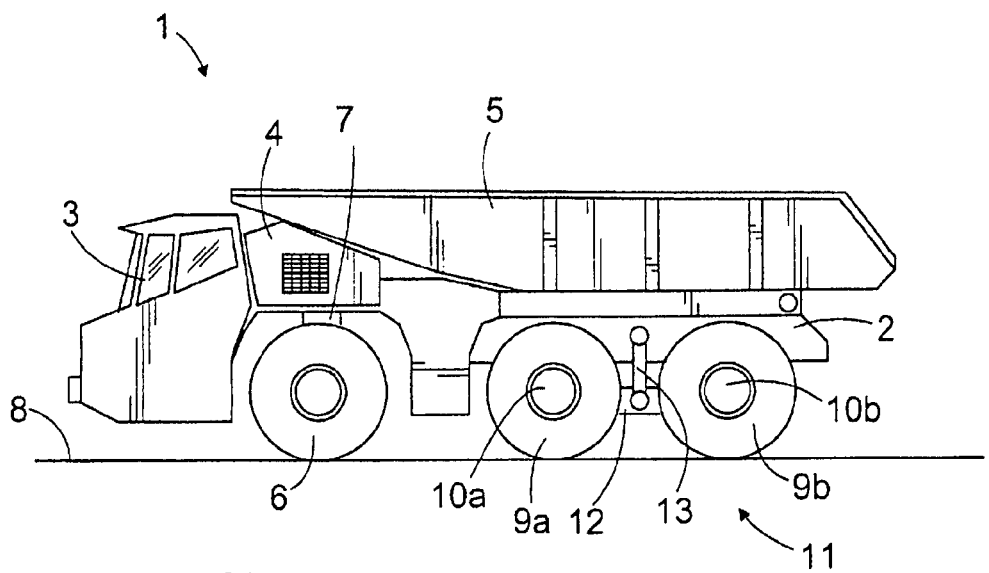
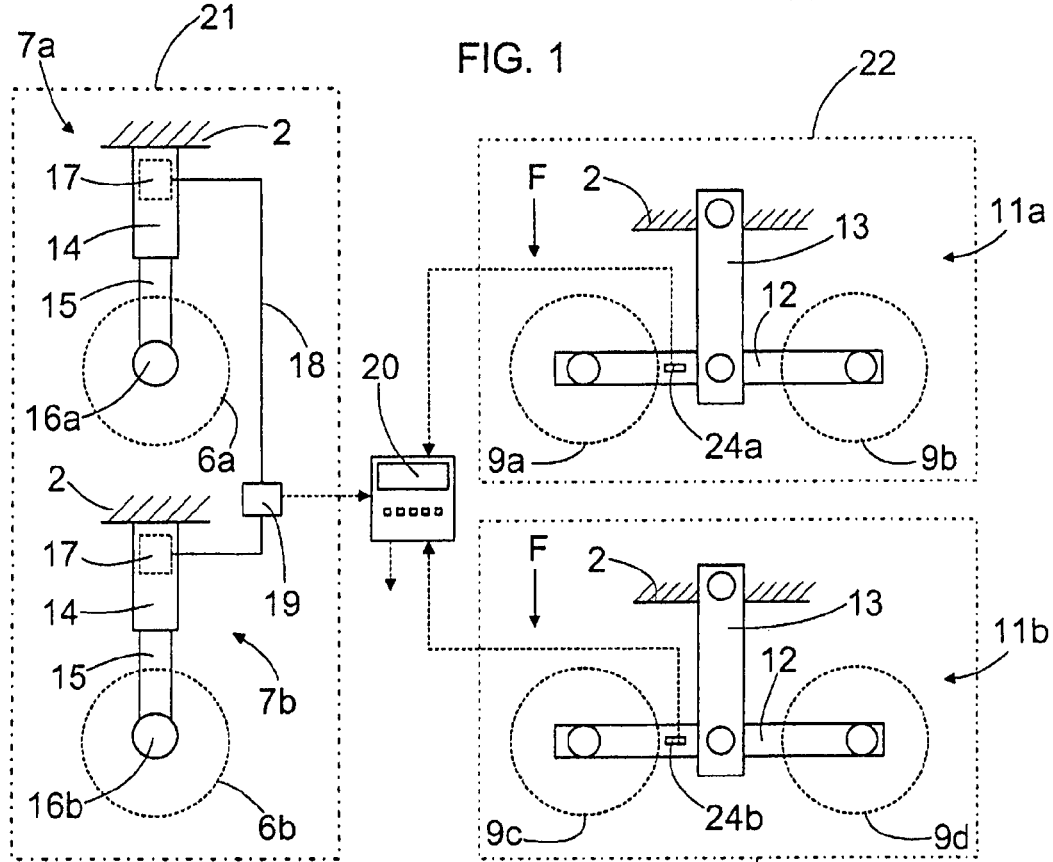
FIG. 1
FIG. 2

ARRANGEMENT FOR WEIGHING TRANSPORT VEHICLE LOAD

CROSS REFERENCE TO RELATED APPLICATIONS

This application is the National Stage of International Application No. PCT/FI2006/050007, filed Jan. 4, 2006, and claims benefit of Finnish Application No. 20055008, filed Jan. 5, 2005.

BACKGROUND OF THE INVENTION

The invention relates to a method for weighing a load of a transport vehicle, the vehicle comprising a body, a loading platform, a plurality of wheels, a wheel suspension for supporting each wheel to the body, and the wheel suspension comprises at least one bogie structure including at least two axles connected to one another on either side of the vehicle by means of a horizontal arm, which horizontal arm is connected to the body by means of a vertical arm, and which method comprises: measuring vertical loads exerted on the wheel suspension, at least at three measurement points, each of which being provided with at least one sensor; conveying measurement data from the sensors to at least one calculating unit of weighing; and determining the weight of the load in the calculating unit on the basis of the measurement data obtained from the measurement points and the calculation parameters of the calculating unit.

The invention also relates to a transport vehicle comprising: a body, a loading platform, a plurality of wheels, a wheel suspension for supporting each wheel to the body, the wheel suspension comprising at least one bogie structure including at least two axles connected to one another on either side of the vehicle by means of a horizontal arm, which horizontal arm is connected to the body by means of a vertical arm, at least three measurement points for measuring vertical loads exerted on the wheel suspension by means of at least one sensor locating at each measurement point, and at least one calculating unit of weighing that is arranged to determine the weight of the load to be transported on the basis of the measurement results obtained from the measurement points.

The invention further relates to a bogie structure of a transport vehicle. The bogie structure comprising: at least a first axle and a second axle, at least a first horizontal arm and a second horizontal arm for connecting the axles to one another on either side of the vehicle, and at least a first vertical arm for connecting the first horizontal arm to the body of the vehicle and at least a second vertical arm for connecting the second horizontal arm to the body of the vehicle.

Extremely heavy transport vehicles are employed at mining and excavation sites for moving rock material. In order that the working site could be appropriately managed and the material flow of the site controlled the amount of moved material should be generally known. So, the payload transported by a vehicle is weighed. Weighing may be carried out by driving the transport vehicle to an on-site weighing station, which makes the operation slower and more cumbersome, however. Alternatively, each transport vehicle may be provided with a specific weighing apparatus. In that case the weighing may take place during loading or transfers. In addition, vehicle-specific weighing may prevent an excessive charge from being loaded onto the transport vehicle, and thus it is possible to avoid damage and premature wear caused to the vehicle. It is previously known to determine the weight of the vehicle payload by measuring the pressure in the lift cylinders of the loading platform. In addition, in some cases there are measured loads exerted on the tipping hinges of the loading platform. A drawback with the weight measurements based on the platform support points is, however, that the position of the gravity centre of the charge on the platform clearly affects the accuracy of the measurement results. Moreover, for the duration of the weighing the platform has to be lifted to rest on lift cylinders, which means that the weighing can be carried out only when the transport vehicle is stationary, because when the platform is lifted to rest on the lift cylinders, the body of the vehicle is subjected to heavy loads, which together with dynamic loads may damage the body of the transport vehicle. Therefore, the weighing based on measuring the platform support points is inaccurate and slow. It is also known to determine the payload of a transport vehicle by measuring the load exerted on the wheel suspension trunnions of the vehicle. In that case as well inaccuracy in measurement poses a problem, because the measurement results depend on the position in which the wheels of the vehicle have been turned. In order for the measurement to be reliable the wheels should always be turned in a given predetermined position during the measurement. Naturally this makes it slower and more difficult to carry out the weighing. All in all, the known weighing solutions have a drawback that their accuracy in measurement is not sufficient and the weighing is difficult and slow to perform.

BRIEF DESCRIPTION OF THE INVENTION

The object of the present invention is to provide a novel and improved method for weighing a payload of transport vehicle, a transport vehicle and a bogie structure.

The method of the invention is characterized by measuring vertical stresses exerted on a horizontal arm with at least one sensor; and treating the horizontal arm as one measurement point in a calculating unit.

The transport vehicle of the invention is characterized in that at least one side surface of the horizontal arm of the bogie structure comprises at least one sensor for determining the vertical load exerted on the horizontal arm; and that the calculating unit is arranged to treat the horizontal arm as one measurement point as the weight of the load is determined.

The bogie structure of the invention is characterized in that at least one side surface of at least one horizontal arm comprises at least one sensor for determining the vertical load exerted on the horizontal arm.

The basic idea of the invention is that on one or more side surfaces of the horizontal arm belonging to the bogie of the transport vehicle there is arranged one or more sensors wherewith it is possible to measure the vertical load exerted on the horizontal arm.

The invention has an advantage that the position of the mass centre of the charge has no substantial importance to the weight measurement result, because in the invention measurements are directed to loads exerted on the wheel suspension and not to loads exerted on the platform fixtures. A further advantage is that during the weighing the loading platform may be held in a lowered position. Furthermore, the position of the wheels has no substantial importance to the measurement results concerning the bogie, and therefore the weighing may be performed at all times and without any particular preparations.

The basic idea of an embodiment of the invention is that a measuring element, which is an elongated piece separate from the horizontal arm, is secured to at least one side surface of the horizontal arm. At a first end and a second end of the measuring element there are securing means for securing the measuring element. On the portion between the securing means there is a measurement portion, to which at least one strain gage is connected. Vertical loads produce deformations in the horizontal arm of the bogie, which deformations also produce one in the measurement portion of the measuring element. A deformation on the measurement portion is detected with the strain gage. A measuring element of this kind is very simple to secure to the side surface of the horizontal arm of the bogie, for instance, with screws, glue or in any other suitable manner. Moreover, if the measuring element fails, it is easy and fast to replace.

The basic idea of an embodiment of the invention is that both vertical and opposing side surfaces of the horizontal arm are provided with at least one sensor for measuring the deformation of the horizontal arm. As the sensors are arranged on both sides of the horizontal arm, lateral loads exerted on the horizontal arm are found out by comparing the measurement results obtained from the sensors. Subsequently, when the calculating unit knows the magnitudes of the lateral loads, their effect on the weighing results can be eliminated.

The basic idea of an embodiment of the invention is that the calculating unit comprises means for filtering the measurement data received from the sensors. Thus the weighing can be carried out as the vehicle is moving. The calculating unit may filter the measurement data such that variations in the measurements resulting from the vehicle movement and other dynamic inaccuracies can be eliminated. Because the weighing can be carried out during a normal transit drive of the vehicle, the weighing does not slow down or impede in any way the operation of the vehicle.

The basic idea of an embodiment of the invention is that in the front part of the transport vehicle there are two or more turnable wheels, each being separately suspended to the body by means of suspension units. Each suspension unit is provided with a hydraulic part which may enable height adjustment of the suspension unit as well as oscillation of wheels on the opposing sides of the transport vehicle. Hydraulic parts of the suspension units in the front part of the transport vehicle are hydraulically interconnected. In one or more hydraulic channels connecting the hydraulic parts there is arranged one or more sensors to measure the hydraulic pressure prevailing in the channel. The measurement result obtained from the pressure sensor is directly proportional to the weight of the charge. This application enables simple determination of a vertical load exerted on the front part of the transport vehicle. In addition, the wheel position has no effect on the measurement results. When this arrangement is used for measuring vertical loads exerted on the wheel suspension in the front part of the vehicle and at the same time when an arrangement measuring vertical loads exerted on the horizontal arms of the bogie is applied in the rear part of the vehicle, the weighing is substantially completely independent of the turning position of the wheels.

The basic idea of an embodiment of the invention is that the front part of the transport vehicle comprises one or more rigid axles that are supported to the body with a central swivel joint so that the axle can be turned in relation to the central swivel joint according to steering movements. In connection with the central swivel joint there is also arranged one or more sensors wherewith vertical loads exerted on the rigid axle, i.e. in practice vertical loads on the front part of the vehicle, are measured. Because the sensor is arranged in connection with the central swivel joint, the position of the axle does not affect the measurement result.

The basic idea of an embodiment of the invention is that the calculating unit comprises at least one processor which allows execution of a computer program that calculates the weight of the payload on the basis of the measurement results and the calculation parameters set in the calculating unit and, when necessary, performs one or more filtrations on the measurement and weighing results.

BRIEF DESCRIPTION OF THE DRAWINGS

Some embodiments of the invention are described in greater detail in connection with the attached drawings, in which FIG. 1 is a schematic view of a transport vehicle in accordance with the invention, which is provided with an arrangement of the invention for weighing a payload, FIG. 2 is a schematic view of wheel suspension in a transport vehicle in accordance with the invention and a weighing arrangement in connection therewith.

For the sake of clarity the figures show some embodiments of the invention in a simplified manner. Like reference numerals refer to like parts in the figures.

DETAILED DESCRIPTION OF SOME EMBODIMENTS OF THE INVENTION

Figure 3:
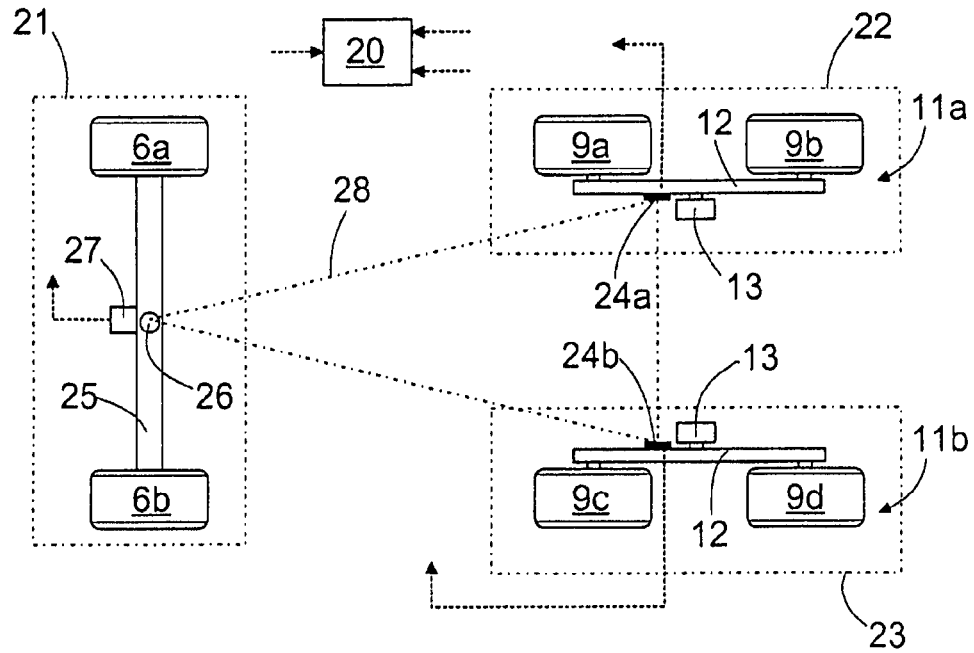
FIG. 3 is a schematic top view of wheel suspension and weighing arrangement in another transport vehicle in accordance with the invention.

FIG. 1 shows a transport vehicle 1 that can be used in a mine, a quarry or an excavation site, for instance, for transporting blasted rock, rock material or soil from a loading site to an unloading site. The transport vehicle 1 may comprise a body 2, a cab 3, a motor unit 4 and a loading platform 5. The transport vehicle 1 may also comprise a plurality of wheels, of which at least some are turning wheels and at least some are drive wheels. The transport vehicle 1 may comprise two or more turning front wheels, by which the transport vehicle 1 can be steered. Each front wheel 6 may be suspended to the body 2 with a specific suspension unit 7 such that the front wheels 6 may move vertically following the irregularities and inclinations of the driving terrain 8. Alternatively the front wheels 6 may be arranged in a rigid front axle that can be turned according to steering movements. The transport vehicle 1 may further comprise two or more rear wheels 9a to 9b. The transport vehicle 1 may comprise two rigid rear axles 10a and 10b constituting a bogie structure 11, to which the rear wheels 9a, 9b are attached. The rear axles 10a and 10b may be interconnected by means of a horizontal arm 12 of the bogie. Further, the horizontal arm 12 may be attached to the body 2 by means of one or more vertical arms 13. The bogie structure 11 may be arranged turnable, for instance, such that the rearmost axle 10b can be turned with respect to the axle 10a. Naturally it is possible that the transport vehicle 1 comprises a plurality of front wheels 6 in tandem and/or in parallel, and correspondingly, a plurality of rear axles 10 and bogie structures 11 in tandem. Wheels at the ends of the axles 10a, 10b belonging to the bogie structure, and correspondingly the front wheels may be single wheels or alternatively there may be a desired number of parallel wheels.

FIG. 2 shows wheel suspension and a weighing system in a transport vehicle 1. In the front part of the transport vehicle 1 there is a first suspension unit 7a and a second suspension unit 7b, which are placed on the opposing sides of the transport vehicle. The upper parts 14 of the suspension units 7a, 7b are supported immovably to the body 2. The lower parts 15 of the suspension units 7a, 7b may move in relation to the upper parts 14 as required by suspension and steering movements. To the lower parts there are also attached wheel hubs 16a, 16b, to which there are attached front wheels 6a, 6b. The front wheel 6a, 6b may thus be supported to the body 2 only by means of the suspension unit 7a, 7b. The suspension unit 7a, 7b may comprise a hydropneumatic spring having a hydraulic part 17 for adjusting the height of the suspension unit and a pressure accumulator that may serve as a resilient element. The hydraulic parts 17 may be interconnected with one or more hydraulic fluid channels 18. In that case the wheels 6a, 6b on the opposing sides of the vehicle may oscillate in such a way that the wheels 6a, 6b can be held firmly against the driving terrain 8 even though it would be inclined. In oscillation the vertical movement of a wheel on the first side of the vehicle makes a wheel on the second side of the vehicle to tend to move in the opposite vertical direction. Because the oscillation, the height adjustment of the suspension unit and the hydropneumatic spring system are not per se concerned in the present invention, it is not necessary to describe their structure in any greater detail in this connection.

Vertical loads exerted on the front part of the transport vehicle 1 can be determined by means of one or more pressure sensors arranged in the hydraulic fluid channel 18. Because the suspension units 7a, 7b are hydraulically interconnected, the magnitude of the pressure prevailing in the hydraulic fluid channel 18 is directly proportional to the vertical load exerted on the front wheels 6a, 6b of the vehicle 1. The pressure sensor 19 measures the pressure prevailing in the hydraulic fluid channel 18 and conveys the measurement data via data transmission connection to the calculating unit 20 of the weighing, where the measurement results can be processed. The front part of the transport vehicle 1 can be treated as one measurement point in the weighing process. In addition to the first measurement point 21 at least two more measurement points are needed, i.e. in total there must be at least three measurement points. Thus, in connection with bogies 11a, 11b in the rear part of the vehicle 1 there are arranged a second measurement point 22 and a third measurement point 23. On at least one side surface of the horizontal arm 12a, 12b of the bogie there is arranged one or more sensors 24a, 24b arranged to measure the vertical load exerted on the horizontal arm. The sensor 24a, 24b may be a strain gage or the like, which is arranged to detect a deformation in the horizontal arm 12a, 12b resulting from a vertical load F exerted thereon and which is arranged to determine the load exerted on the horizontal arm 12a, 12b on the basis of the deformation. The measurement results are conveyed from the sensor 24a, 24b via a telecommunication connection to the calculating unit 20 of the weighting, which determines the vertical load at measurement points 21, 22 and 23 on the basis of the measurement results received. The calculating unit 20 may also calculate the weight of the payload on the basis of the vertical loads at the measurement points 21, 22 and 23, the vehicle's 1 own mass and other data entered in the calculating unit 20.

The calculating unit 20 may be a computer, a programmable logic or another similar device, in the processor of which it is possible to execute a program for calculating the weighing results. The calculating unit 20 may be a separate device or it may be integrated in the control unit of the transport vehicle 1. It is possible to install a program in the calculating unit 20 and the execution of said program enables the calculating unit to process the measurement results in a desired manner, for instance, to filter out inaccuracies in measurement results. The computer program can be loaded into the memory of the calculating unit 20 from a memory medium, another computer or a network. The calculating unit 20 can also be given necessary measurement and calculation parameters, such as the vehicle's 1 own mass, for instance.

FIG. 3 shows an alternative wheel suspension. In this case the transport vehicle 1 comprises one rigid front axle 25, at the ends of which front wheels 6a, 6b are arranged. The front axle 25 may be provided with a central swivel joint 26, which allows the front axle to be turned according to the steering movements. In connection with the central swivel joint 26 there may also be arranged one or more sensors 27, wherewith it is possible to measure the vertical load transmitted from the body 2 via the central swivel joint 26 to the front axle 25. In this case a first measurement point 21 is thus arranged in connection with the rigid front axle 25. A second measurement point 22 and a third measurement point 23 may be located in connection with the bogie structures 11a and 11b. Hence, the measurement points 21, 22 and 23 may be placed in a triangular formation 28.

Figure 4:
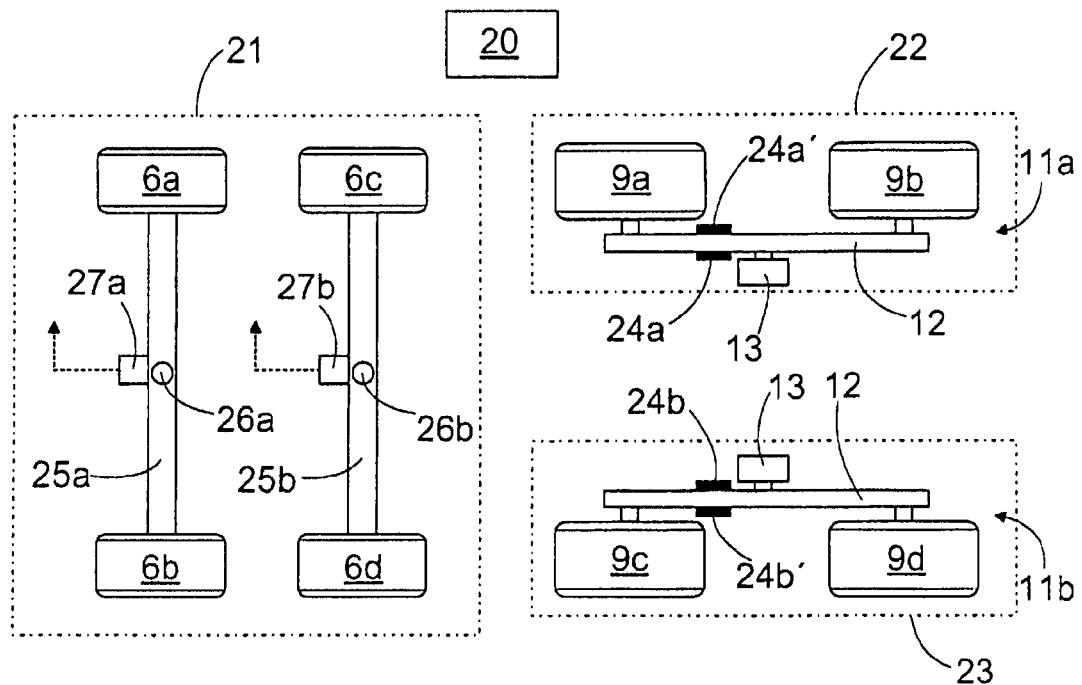
FIG. 4 is a schematic top view of an option to arrange sensors in the bogies of a transport vehicle.

FIG. 4 shows an arrangement, in which the front part of the transport vehicle 1 comprises two successive rigid front axles 25a, 25b which can be turned in relation to the central swivel joints 26a, 26b. Further, in connection with the central swivel joints 26a, 26b there may be sensors 27a, 27b for measuring the vertical load exerted on the front axles 25a, 25b. In this case the first measurement point 21 comprises both of the front axles 25a and 25b, whereby the vertical load of the first measurement point 21 is the summed load obtained from the sensors 27a, 27b.

FIG. 4 also shows that both vertical side surfaces of the horizontal arm 12 in the bogie 11a, 11b may comprise sensors 24a, 24a' and correspondingly 24b, 24b'. When the sensors are arranged on both sides of the horizontal arm 12, the lateral forces exerted on the horizontal arm 12 can be detected and noted and their effect on the measurement results can be compensated for. If lateral forces are exerted on the horizontal arm 12, it bends in the lateral direction, whereby the sensors 24 on different sides of the horizontal arm 12 give different measurement results. At simplest, inconveniences resulting from lateral forces can be eliminated by assuming the combined value of the sensors 24a and 24a' as the measurement result of the measurement point 22 and correspondingly by assuming the combined value of the sensors 24b and 24b' as the measurement result of the measurement point 23.

Further, it is possible that in the front part of the transport vehicle 1, on both sides of the vehicle, there are two, four, six or any other even number of separately sprung suspension units, the hydraulic parts of which are interconnected to the hydraulic parts of the suspension units locating on the opposing side of the vehicle, for instance, in the manner shown in FIG. 2. In that case the measurement results obtained from the pressure sensors connected to the hydraulic fluid channels can be summed for determining the vertical load exerted on the front part of the vehicle. On the other hand, in connection with each suspension unit there may be a specific sensor for measuring the vertical load. The sensor may be arranged, for instance, in the upper part of the suspension unit, in the attachment point between the suspension unit and the body, whereby the position of the wheel will not affect the measurement result. The measurement results obtained from the sensor in connection with each suspension unit can be summed up and thus the vertical load at the first measurement point can be determined.

Figure 5:
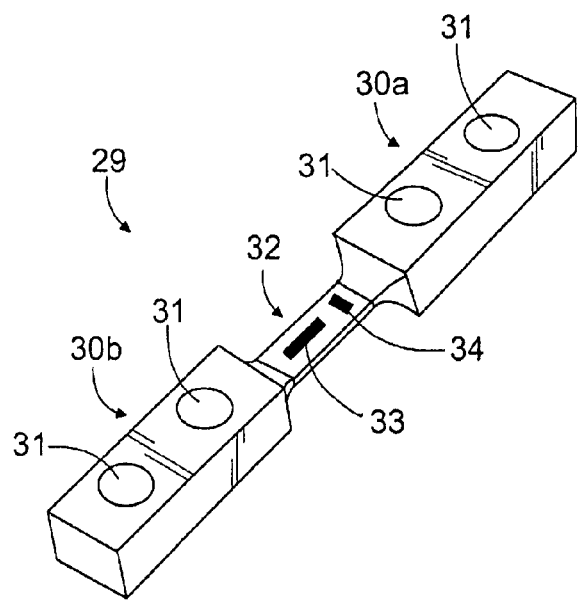
FIG. 5 is a schematic perspective view of a measuring element that can be secured to a horizontal arm of the bogie.

FIG. 5 shows a measuring element 29 which can be attached to a side surface of a horizontal arm 12 of the bogie. The measuring element 29 may be an elongated piece which may be made, for instance, of steel, other metal material or it may be a composite structure consisting of fibre reinforcement and plastic material. At a first end and a second end of the measuring element 29 there may be securing means 30a, 30b for attaching the measuring element. The securing means 30a, 30b may comprise enlargement portions and apertures 31, through which the securing means 30a, 30b can be attached with screws, for instance, immovably to the horizontal arm 12. Alternatively, the measuring element 29 can be attached, for instance, with glue, shape-locking or with a quick-clamping means. Further, on the portion between the securing means 30a, 30b there may be a measuring portion 32, to which there may be attached one or more strain gages 33 or the like. The sensors 33 are generally attached to the side on the outer surface of the measuring element 29. On the measuring portion 32 there may also be one or more compensation sensors 34, by means of which it is possible to compensate for the effect of temperature and that of the transverse strain of the measuring element.

Figure 6:
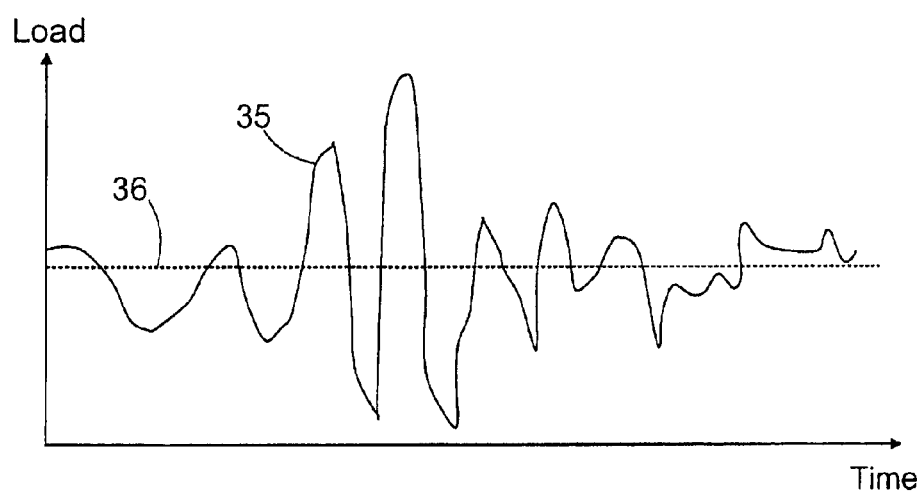
FIG. 6 shows schematically measurement data from one sensor measuring vertical loads and a result obtained on the measurement data by filtering.

FIG. 6 shows measurement data obtained from a sensor measuring a vertical load. As it can be seen from the figure, there are variations 35 in the measurement results, which may result from the measurement being carried out while the vehicle was moving. In that case the variations may be caused by irregularities in the driving terrain, changes in the speed of the vehicle, i.e. accelerations and decelerations, and load movements due to inclinations in the driving terrain, for instance. The calculating unit 20 of the weighing may process the measurement results if necessary, for instance, such that the dynamic variation 35 of this kind can be filtered out of the measurement result. Thus the calculating unit 20 may form a filtered measurement result 36, on the basis of which the weight of the payload can be subsequently determined.

In some cases the features described in the present document can be used as such, irrespective of other features. On the other hand, the features described in the present document can be combined, where necessary, to provide various combinations.

The drawings and the relating description are only intended to illustrate the inventive idea. The details of the invention may vary within the scope of the claims.

The invention claimed is:

1. A method for weighing a payload of an excavation site transport vehicle,
   the vehicle comprising a body, a loading platform, a plurality of wheels, a wheel suspension for supporting each wheel to the body, and the wheel suspension comprises at least one bogie structure including at least two axles connected to one another on either side of the vehicle by means of a horizontal arm, which horizontal arm is in longitudinal direction of the vehicle and is connected to the body by means of a vertical arm,
   the method comprising:
       measuring vertical loads exerted on the wheel suspension, at least at three measurement points, each being provided with at least one sensor;
       conveying measurement data from the sensors to at least one calculating unit of weighing;
       determining the weight of the load in the calculating unit on the basis of the measurement data obtained from the measurement points and the calculation parameters of the calculating unit;
   treating the horizontal arm as one measurement point in the calculating unit;
       measuring the stresses exerted on the horizontal arm with at least two sensors;
       arranging the sensors on the opposing and substantially vertical side surfaces of the horizontal arm; and
       calculating a total value of the measurement results obtained from the sensors on the opposing sides of the horizontal arm and using the calculated value as the measurement result, whereby the effect of lateral forces will be eliminated.

2. The method of claim 1, comprising measuring deformation of the horizontal arm with at least one strain gage.

3. The method of claim 1, comprising measuring the vertical loads while the transport vehicle is moving, and
   performing in the calculating unit at least one filtration on the measurement results, whereby the variations resulting from horizontal and vertical movements of the transport vehicle can be eliminated from the measurement results.

4. An excavation site transport vehicle comprising:
   a body;
   a loading platform;
   a plurality of wheels;
   a wheel suspension for supporting each wheel to the body, the wheel suspension comprising at least one bogie structure including at least two axles connected to one another on either side of the vehicle by means of a horizontal arm, the horizontal arm being in a longitudinal direction of the vehicle and being connected to the body by means of a vertical arm;
   at least three measurement points for measuring vertical loads exerted on the wheel suspension by means of at least one sensor locating at each measurement point; and
   at least one calculating unit for weighing arranged to determine the weight of the payload to be transported on the basis of the measurement results obtained from the measurement points
   wherein the bogie structure comprises at least two sensor for determining the vertical load exerted on the horizontal arm,
   the calculating unit is arranged to treat the horizontal arm as one measurement point when the weight of the load is determined,
   the sensors are arranged on the opposing side surfaces of the horizontal arm, whereby the lateral forces exerted on the horizontal arm is detected, and
   the calculating unit is arranged to compensate the effect of the lateral forces on the measurement results.

5. The transport vehicle of claim 4, wherein
   the transport vehicle comprises at least two suspension units for supporting turning front wheels to the body,
   each suspension unit comprises a hydropneumatic spring element including a hydraulic part,
   the transport vehicle comprises at least one pressure sensor for measuring the pressure acting in the hydraulic parts of the suspension units, and
   the calculating unit is arranged to treat the measurement data obtained from the pressure sensor as one measurement point.

6. The transport vehicle of claim 4, wherein
   the transport vehicle comprises at least two suspension units for supporting the turning front wheels to the body,
   each suspension unit comprises a hydropneumatic spring element including a hydraulic part,
   the transport vehicle comprises at least one pressure sensor for measuring the pressure acting in the hydraulic parts of the suspension units,
   the calculating unit is arranged to treat the measurement data obtained from the pressure sensor as one measurement point, the hydraulic parts of at least two suspension units are interconnected with at least one hydraulic fluid channel, and in the hydraulic fluid channel there is arranged at least one pressure sensor whose measurement result is directly proportional to the total vertical load exerted on the hydraulically connected suspension units.

7. The transport vehicle of claim 4, wherein a separate measuring element is detachably attached on at least one side surface of the horizontal arm, the measuring element is an elongated piece at the ends of which there are securing means and between the ends there is a measuring portion, and on the measuring portion there is attached at least one strain gage which is arranged to determine the vertical load exerted on the horizontal arm on the basis of deformation of the measuring portion.

8. The transport vehicle of claim 4, wherein the calculating unit comprises at least one processor, in which it is possible to execute a computer program for determining the weight of the load on the basis of the measurement results obtained from the measurement points and the calculation parameters entered in the calculating unit.

9. A transport vehicle comprising:

a body;

a loading platform;

a plurality of wheels;

a wheel suspension for supporting each wheel to the body, the wheel suspension comprising at least one bogie structure including at least two axles connected to one another on either side of the vehicle by means of a horizontal arm, the horizontal arm being connected to the body by means of a vertical arm;

at least three measurement points for measuring vertical loads exerted on the wheel suspension by means of at least one sensor locating at each measurement point; and at least one calculating unit for weighing arranged to determine the weight of the payload to be transported on the basis of the measurement results obtained from the measurement points wherein the bogie structure comprises at least two sensor for determining the vertical load exerted on the horizontal arm, the calculating unit is arranged to treat the horizontal arm as one measurement point when the weight of the load is determined, the sensors are arranged on the opposing side surfaces of the horizontal arm, whereby the lateral forces exerted on the horizontal arm is detected, and the calculating unit is arranged to compensate the effect of the lateral forces on the measurement results, wherein the calculating unit is arranged to perform at least one filtration on the measurement results.

10. A method for weighing a payload of a transport vehicle, the vehicle comprising a body, a loading platform, a plurality of wheels, a wheel suspension for supporting each wheel to the body, and the wheel suspension comprises at least one bogie structure including at least two axles connected to one another on either side of the vehicle by means of a horizontal arm, which horizontal arm is connected to the body by means of a vertical arm, the method comprising:

measuring vertical loads exerted on the wheel suspension, at least at three measurement points, each being provided with at least one sensor;

conveying measurement data from the sensors to at least one calculating unit of weighing;

determining the weight of the load in the calculating unit on the basis of the measurement data obtained from the measurement points and the calculation parameters of the calculating unit;

treating the horizontal arm as one measurement point in the calculating unit;

measuring the stresses exerted on the horizontal arm with at least two sensors;

arranging the sensors on the opposing and substantially vertical side surfaces of the horizontal arm;

calculating a total value of the measurement results obtained from the sensors on the opposing sides of the horizontal arm and using the calculated value as the measurement result, whereby the effect of lateral forces will be eliminated;

measuring the vertical loads while the transport vehicle is moving, and performing in the calculating unit at least one filtration on the measurement results, whereby the variations resulting from horizontal and vertical movements of the transport vehicle can be eliminated from the measurement results.

11. The transport vehicle of claim 4, wherein the sensors are arranged directly against the vertical side surface of the horizontal arm.

12. The transport vehicle of claim 4, wherein the loading platform is a dump box capable of receiving rock material.

* * * * *